United States Patent [19]

Mount

[11] Patent Number: 4,514,989

[45] Date of Patent: May 7, 1985

[54] METHOD AND CONTROL SYSTEM FOR PROTECTING AN ELECTRIC MOTOR DRIVEN COMPRESSOR IN A REFRIGERATION SYSTEM

[75] Inventor: Gordon L. Mount, West Monroe, N.Y.

[73] Assignee: Carrier Corporation, Syracuse, N.Y.

[21] Appl. No.: 610,150

[22] Filed: May 14, 1984

[51] Int. Cl.³ .................... F25D 17/02; H02H 7/00
[52] U.S. Cl. ........................... 62/201; 62/230; 361/22
[58] Field of Search .......... 62/201, 230, 125, 126, 62/129, 226, 228.5, 228.1; 340/664, 648; 361/22, 24, 93

[56] References Cited

U.S. PATENT DOCUMENTS

| | | | |
|---|---|---|---|
| 3,377,816 | 4/1968 | Berger | 62/192 |
| 3,585,451 | 6/1971 | Day | 62/230 X |
| 3,598,214 | 8/1971 | Harris | 192/148 |
| 3,633,073 | 1/1972 | Day | 62/230 X |
| 3,721,880 | 3/1973 | Neill | 318/471 |
| 4,034,570 | 7/1977 | Anderson et al. | 62/215 X |
| 4,045,973 | 9/1977 | Anderson et al. | 62/158 |
| 4,142,375 | 3/1979 | Abe et al. | 62/158 |

*Primary Examiner*—Harry Tanner
*Attorney, Agent, or Firm*—Douglas L. Miller

[57] ABSTRACT

A method and control system for protecting an electric motor driven compressor in a refrigeration system are disclosed. The refrigeration system operates to satisfy a load placed on the system and the refrigeration system compressor is turned off when the load is satisfied and the refrigeration system is providing excess capacity. When the compressor is turned off due to excess capacity, current flow to the electric motor driving the compressor is sensed and the refrigeration system is shut down if the sensed current flow is abnormal. In this manner, the compressor and the electric motor driving the compressor are protected against restarting under unfavorable operating conditions which could unduly wear the compressor motor and/or the compressor.

8 Claims, 1 Drawing Figure

U.S. Patent
May 7, 1985
4,514,989
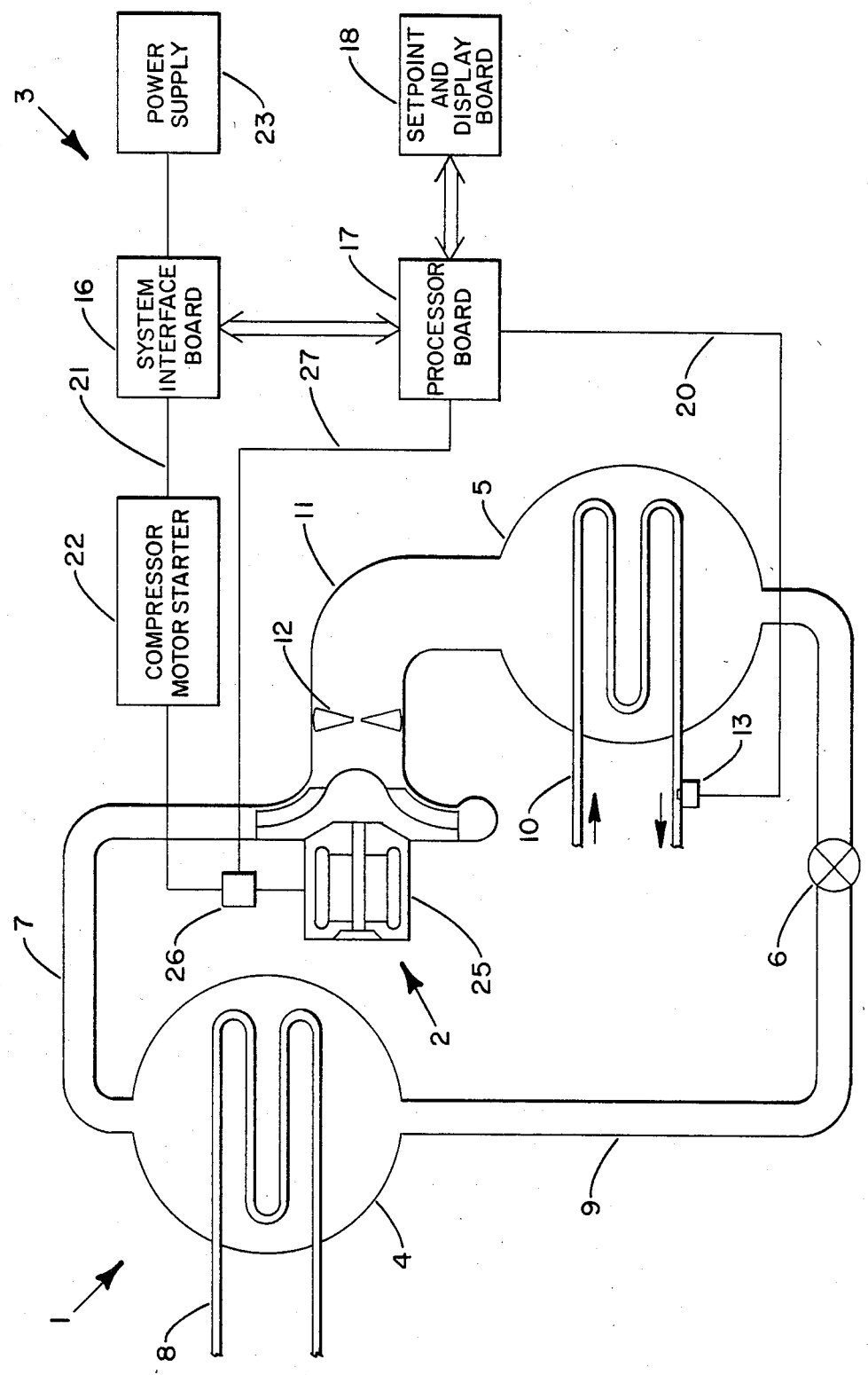

METHOD AND CONTROL SYSTEM FOR PROTECTING AN ELECTRIC MOTOR DRIVEN COMPRESSOR IN A REFRIGERATION SYSTEM

BACKGROUND OF THE INVENTION

The present invention relates to methods of operating and control systems for refrigeration systems and, more particularly, to methods of operating and control systems for protecting an electric motor driven compressor in a refrigeration system.

Generally, refrigeration systems include an evaporator or cooler, a compressor, and a condenser. Usually, a heat transfer fluid is circulated through tubing in the evaporator thereby forming a heat transfer coil in the evaporator to transfer heat from the heat transfer fluid flowing through the tubing to refrigerant in the evaporator. The heat transfer fluid chilled in the tubing in the evaporator is normally water which is circulated to a remote location to satisfy a refrigeration load. The refrigerant in the evaporator evaporates as it absorbs heat from the water flowing through the tubing in the evaporator, and the compressor operates to extract this refrigerant vapor from the evaporator, to compress this refrigerant vapor, and to discharge the compressed vapor to the condenser. In the condenser, the refrigerant vapor is condensed and delivered back to the evaporator where the refrigeration cycle begins again.

Systems are known for protecting an electric motor driving a compressor in a refrigeration system of the type described above. For example, one such system senses compressor motor current each time the compressor motor is started. If the sensed motor current exceeds a preselected level which could damage the compressor motor, then the refrigeration system is shut down for a period of time before attempting to restart the system. Another such system includes a timing device to provide a time delay for preventing a refrigeration system from starting for a fixed, selected time interval following any de-energization of the compressor motor. This allows refrigerant pressures in the refrigeration system to equalize so that the compressor motor is not started against a high head pressure between the condenser and the evaporator of the refrigeration system which may damage or unduly wear the compressor motor.

While known protection systems, such as those described above, are effective for their intended purposes, these systems are not suitable for protecting an electric motor driven compressor against recycle starts (starts after shutdown of a refrigeration system due to excess capacity) under certain abnormal operating conditions, such as a recycle start under relatively heavy load. However, it is desirable to protect the compressor against recycle starts under such abnormal operating conditions since they may reduce the operating life of the compressor motor and/or the compressor.

SUMMARY OF THE INVENTION

Therefore, it is an object of the present invention to protect an electric motor driven compressor in a refrigeration system from recycle starts under abnormal operating conditions such as a recycle start under relatively heavy load.

This and other objects of the present invention are attained by a method and control system for sensing current flow to an electric motor driving a compressor in a refrigeration system when the refrigeration system is shutdown due to excess capacity and for preventing a recycle start of the compressor if the sensed current flow indicates the presence of abnormal operating conditions. According to the present invention, the refrigeration system is turned on when it is desired to satisfy a load placed on the refrigeration system. The refrigeration system compressor is turned off when the load is satisfied and when the refrigeration system is providing excess capacity. Current flow to the compressor motor is sensed when the compressor is turned off due to excess capacity and the refrigeration system is shutdown if the sensed current flow is abnormal. In this manner, the compressor is prevented from making a recycle start under unfavorable operating conditions which could result in undesirable wear of the compressor motor and/or the compressor.

BRIEF DESCRIPTION OF THE DRAWING

Still other objects and advantages of the present invention will be apparent from the following detailed description of the present invention in conjunction with the accompanying drawing in which:

The FIGURE is a schematic illustration of a centrifugal vapor compression refrigeration system with a control system, according to the present invention, for protecting an electric motor driving a compressor in the refrigeration system.

DESCRIPTION OF THE PREFERRED EMBODIMENT

Referring to the FIGURE, a vapor compression refrigeration system 1 is shown having a control system 3 for protecting an electric motor driven compressor 2 according to the principles of the present invention. As shown in the FIGURE, the refrigeration system 1 includes a condenser 4, an evaporator 5 and an expansion valve 6. In operation, compressed gaseous refrigerant is discharged from the compressor 2 through compressor discharge line 7 to the condenser 4 wherein the gaseous refrigerant is condensed by relatively cool condensing water flowing through tubing 8 in the condenser 4. The condensed liquid refrigerant from the condenser 4 passes through the expansion valve 6 in refrigerant line 9 to evaporator 5. The liquid refrigerant in the evaporator 5 is evaporated to cool a heat transfer fluid, such as water, flowing through tubing 10 in the evaporator 5. This cool heat transfer fluid is used to cool a building or is used for other such purposes. The gaseous refrigerant from the evaporator 5 flows through compressor suction line 11 back to compressor 2 under the control of compressor inlet guide vanes 12. The gaseous refrigerant entering the compressor 2 through the guide vanes 12 is compressed by the compressor 2 and discharged from the compressor 2 through the compressor discharge line 7 to complete the refrigeration cycle. This refrigeration cycle is continuously repeated during normal operation of the refrigeration system 1.

Also, as shown in the FIGURE, the centrifugal compressor 2 of the refrigeration system 1 includes an electric motor 25 for driving the compressor 2. The electric motor 25 is under the control of the control system 3 which includes a compressor motor starter 22, a power supply 23, a system interface board 16, a processor board 17, and a set point and display board 18. Also, a temperature sensor 13 for sensing the temperature of the heat transfer fluid leaving the evaporator 5 through the tubing 10, is connected by electrical lines 20 directly to the processor board 17. In addition, a motor current sensor 26 is connected by electrical lines 27 directly to the processor board 17.

Preferably, the temperature sensor 13 is a temperature responsive resistance device such as a thermistor having its sensing portion located in the heat transfer fluid leaving the evaporator 5 with its resistance monitored by the processor board 17, as shown in the FIGURE. Of course, as will be readily apparent to one of ordinary skill in the art to which the present invention pertains, the temperature sensor 13 may be any of a variety of temperature sensors suitable for generating a signal indicative of the temperature of the heat transfer fluid leaving the evaporator 5 and for supplying this generated signal to the processor board 17.

Preferably, the motor current sensor 26 is a conventional current transformer with a signal resistor. Of course, as will be readily apparent to one of ordinary skill in the art to which the present invention pertains, the motor current sensor 26 may be any of a variety of sensors suitable for generating a signal indicative of the current flow to the electric motor 25 of the compressor 2 and for supplying this generated signal to the processor board 17.

The processor board 17 may be any device, or combination of devices, capable of receiving a plurality of input signals, processing the received input signals according to preprogrammed procedures, and producing desired output control signals in response to the received and processed input signals, in a manner according to the principles of the present invention. For example, the processor board 17 may comprise a microcomputer, such as model 8031 microcomputer available from Intel Corporation which has a place of business at Santa Clara, Calif.

Further, preferably, the set point and display board 18 comprises a visual display, including, for example, light emitting diodes (LED's) or liquid crystal display (LCD's) devices forming a multi-digit display which is under the control of the processor board 17. Also, the set point and display board 18 includes a device, such as a set point potentiometer model AW5403 available from CTS, Inc. which has a place of business at Skyland, N.C., which is adjustable to output a signal to the processor board 17 indicative of a selected set point temperature for the heat transfer fluid leaving the evaporator 5 through the tubing 10.

Still further, preferably, the system interface board 16 includes at least one switching device, such as a model SC140 triac available from General Electric Company which has a place of business at Auburn, N.Y., which is used as a switch for providing electrical power from the power supply 23 through electrical lines 21 to the compressor motor starter 22. The triac switches on the system interface board 16 are controlled in response to control signals received by the triac switches from the processor board 17. In this manner, electrical power is supplied through the electrical lines 21 to the compressor motor starter 22 under control of the processor board 17 to operate the compressor 2 in the manner according to the principles of the present invention which is described in detail below. Of course, as will be readily apparent to one of ordinary skill in the art to which the present invention pertains, switching devices other than triac switches may be used in controlling power flow from the power supply 23 through the electrical lines 21 to the compressor motor starter 22 in response to output control signals from the processor board 17.

Still further, preferably, the compressor motor starter 22 is a conventional wye-delta (Y-Δ) contactor type motor starter for supplying electrical power from the power supply 23 to the electric motor 25 of the compressor 2 to start up and run the motor 25. Of course, as will be readily apparent to one of ordinary skill in the art to which the present invention pertains, the compressor motor starter 22 may be any one of a variety of systems for supplying electrical power from the power supply 23 to the electric motor 25 of the compressor 2 to start and run the motor 25.

In operation, the temperature sensor 13 senses the temperature of the heat transfer fluid in tubing 10 leaving the evaporator 5 and a signal indicative of this sensed temperature is supplied to the processor board 17 of the control system 3. Also, a signal indicative of a set point temperature is supplied from the set point and display board 18 to the processor board 17. This set point temperature is an operator selected temperature to which the heat transfer fluid leaving the evaporator 5 is to be cooled by operation of the refrigeration system 1. Thus, the temperature sensed by the temperature sensor 13 relative to the set point temperature setting of the set point and display board 18 represents a refrigeration load to be satisfied by operation of the refrigeration system 1.

The processor board 17 is programmed to compare the temperature sensed by the temperature sensor 13 to the selected set point temperature setting of the set point and display board 18. If the sensed temperature sensed by the temperature sensor 13 exceeds the set point temperature setting of the set point and display board 18 by a predetermined amount, the processor board 17 generates control signals to turn on the refrigeration system 1. As part of turning on the refrigeration system 1, the processor board 17 supplies an electrical control signal to the system interface board 16 to close the triac switch on the system interface board 16. This results in electrical power flow from the power supply 23 through the electrical lines 21 to the compressor motor starter 22 which starts and runs the electric motor 25 of the compressor 2 in the refrigeration system 1. Thus, the processor board 17 turns on the refrigeration system 1, including the refrigeration system compressor 2, when it detects a load to be satisfied by operation of the refrigeration system 1.

After the refrigeration system 1 is turned on by the processor board 17, the refrigeration system 1 continuously operates to satisfy the refrigeration load. The processor board 17 adjusts the capacity of the refrigeration system 1 to match the load by controlling means (not shown in the FIGURE), such as a guide vane actuator, for moving the compressor inlet guide vanes 12 between a fully open and a fully closed position. However, if the processor board 17 determines that the load has been satisfied and that the refrigeration system 1 is providing excess cooling capacity for satisfying the load, the processor board 17 generates a control signal to open the triac switch on the system interface board 16 thereby discontinuing the power flow from the power supply 23 through the compressor motor starter 22 to the electric motor 25 of the compressor 2 of the refrigeration system 1. This action by the process board 17 effectively turns off the refrigeration system compressor 2 while otherwise maintaining the refrigeration system 1 in operation.

When the compressor 2 is turned off by the processor board 17 due to excess cooling capacity, the processor board 17 monitors the electrical current flow to the electric motor 25 of the compressor 2 through the motor current sensor 26. This monitored current flow is an indirect indication of the load on the refrigeration system 1 since the current flow to the compressor motor 25 is directly related to the amount of work which must be done by the compressor 2 to satisfy the load. This monitored current flow is also an indirect indication of the capacity of the refrigeration system 1 since the guide vanes 12 which control the capacity of the refrigeration system 1 are adjusted by the processor board 17 in response to the load on the refrigeration system 1 as described previously.

Under normal operating conditions for the refrigeration system 1, when the compressor 2 is turned off by the processor board 17 due to excess capacity, the refrigeration system 1 should be operating at minimum capacity with the guide vanes 12 positioned at their fully closed position. This is true because the processor board 17 senses excess cooling capacity by detecting when the sensed temperature of the heat transfer fluid in the tubing 10 leaving the evaporator 5 decreases below the set point temperature setting of the set point and display board 18 by a predetermined amount which indicates excessive cooling of the heat transfer fluid. However, the foregoing condition cannot normally occur before the processor board 17 has attempted to match the relatively low load on the refrigeration system 1 by driving the guide vanes 12 to their fully closed position. Therefore, under normal operating conditions when the compressor 2 is turned off by the processor board 17 due to excess cooling capacity, the current flow to the compressor motor 25 is normally relatively low because the refrigeration system 1 is operating at minimum capacity in an attempt to meet relatively low load requirements.

According to the present invention, if the electrical current flow to the compressor motor 25 is within a normal low range when the compressor 2 is turned off by the processor board 17 due to excess cooling capacity, no special action is taken by the control system 3. The processor board 17 continues to monitor the load on the refrigeration system 1 by comparing the temperature of the heat transfer fluid in the tubing 10 leaving the evaporator 5, as sensed by the temperature sensor 13, to the desired heat transfer fluid temperature as set on the set point and display board 18. When the processor board 17 detects an increase in the load on the refrigeration system 1 which needs to be satisfied by operation of the refrigeration system, the processor board 17 generates a control signal to close the appropriate triac switch on the system interface board 16 so that electrical power again flows from the power supply 23 through the electrical lines 21 and through the compressor motor starter 22 to the compressor motor 25 thereby again turning on the refrigeration system compressor 2. This is a normal recycle start of the compressor 2 after the compressor 2 has been turned off by the processor board 17 due to excess cooling capacity.

However, if the electrical current flow to the compressor motor 25 as monitored by the processor board 17 exceeds a preselected value indicating an abnormal magnitude of current flow to the compressor motor 25 when the compressor 2 is turned off by the processor board 17 due to excess cooling capacity, the processor board 17 provides output control signals to appropriate control systems and devices in the refrigeration system 1 to shut down operation of the refrigeration system 1. This shutdown includes supplying an electrical control signal to the system interface board 16 to open the appropriate triac switch on the system interface board 16 to prevent electrical power flow from the power supply 23 through the electrical lines 21 and through the compressor motor starter 22 to the compressor motor 25 of the compressor 2 of the refrigeration system 1. Preferably, the preselected value of the current flow magnitude for shutdown of the refrigeration system 1 is an upper limit of the normal range of electrical current flow to the compressor motor 25 prior to the compressor 2 being turned off by the processor board 17 due to excess cooling capacity. For example, the preselected value of the current flow magnitude for shutdown of the refrigeration system 1 may be 50% of the normal compressor motor 25 current flow present when the refrigeration system 1 is operating at full load. Any value of the monitored magnitude of the current flow to the compressor motor 25 in excess of this 50% value is clearly an abnormal operating condition for the refrigeration system 1 when the compressor 2 is turned off by the processor board 17 due to excess cooling capacity. Therefore, in such a situation, according to the present invention, in refrigeration system 1 is shutdown to prevent the compressor 2 from making a recycle start under unfavorable operating conditions which could undesirably wear the compressor motor 25 and/or the compressor 2.

In addition, when the refrigeration system 1 is shutdown as described above due to an abnormal current flow to the compressor motor 25 prior to turning off the compressor 2 due to excess cooling capacity, the processor board 17 generates and supplies a control signal to the set point and display board 18 to activate the visual display on the board 18 to indicate cause of the shutdown to an operator of the refrigeration system 1. This alerts the operator of the refrigeration system to a possible malfunction in the refrigeration system 1 which the operator may then check out and correct before again placing the refrigeration system 1 in operation. Thus, recycle starts of the compressor 2 under unfavorable operating conditions are avoided thereby extending the operating life of the compressor 2.

Of course, the foregoing description is directed to a particular embodiment of the present invention and various modifications and other embodiments of the present invention will be readily apparent to one of ordinary skill in the art to which the present invention pertains. Therefore, while the present invention has been described in conjunction with a particular embodiment, it is to be understood that various modifications and other embodiments of the present invention may be made without departing from the scope of the invention as described herein and as claimed in the appended claims.

What is claimed is:

1. A method of operating a refrigeration system having a compressor driven by an electric motor, comprising:

monitoring a load to be satisfied by operation of the refrigeration system;

turning on the refrigeration system, including the refrigeration system compressor, when the step of monitoring detects a load to be satisfied by operation of the refrigeration system;

turning off the refrigeration system compressor when the load is satisfied and the refrigeration system is providing excess capacity for satisfying the load;

sensing current flow to the electric motor driving the refrigeration system compressor when the compressor is turned off due to excess capacity; and shutting down operation of the refrigeration system if the sensed current flow is abnormal.

2. A method of operating a refrigeration system as recited in claim 1 wherein the step of monitoring comprises:

sensing the temperature of a heat transfer fluid which is cooled by operation of the refrigeration system.

3. A method of operating a refrigeration system as recited in claim 1 wherein the step of shutting down operation of the refrigeration system comprises:

shutting down operation of the refrigeration system when the sensed current flow is greater than a selected percentage of the compressor current flow normally present when the refrigeration system is operating at full load.

4. A method of operating a refrigeration system as recited in claim 1 further comprising:

generating a shutdown signal to indicate cause of the shutdown to an operator of the refrigeration system when the refrigeration system is shut down due to the sensed current flow being abnormal.

5. A control system for a refrigeration system having a compressor driven by an electric motor comprising:

means for monitoring a load to be satisfied by operation of the refrigeration system;

means for turning on the refrigeration system, including means for turning on the refrigeration system compressor, when the means for monitoring detects a load to be satisfied by operation of the refrigeration system;

means for turning off the refrigeration system compressor when the load is satisfied and the refrigeration system is providing excess capacity for satisfying the load;

means for sensing current flow to the electric motor driving the refrigeration system compressor when the compressor is turned off due to excess capacity; and means for shutting down operation of the refrigeration system when the sensed current flow is abnormal.

6. A control system for a refrigeration system having a compressor driven by an electric motor as recited in claim 5 wherein the means for monitoring comprises:

means for sensing the temperature of a heat transfer fluid which is cooled by operation of the refrigeration system.

7. A control system for a refrigeration system having a compressor driven by an electric motor as recited in claim 5, further comprising:

means for generating a shutdown signal to indicate cause of the shutdown to an operator of the refrigeration system when the refrigeration system is shut down due to the sensed current flow being abnormal.

8. A control system for a refrigeration system having a compressor driven by an electric motor as recited in claim 7 wherein the means for generating comprises:

a visual display including visual display devices controlled by a microcomputer system.

* * * * *